(12) United States Patent
Kim (10) Patent No.: US 6,532,278 B2
(45) Date of Patent: Mar. 11, 2003

(54) ANNOUNCEMENT DEVICE WITH VIRTUAL RECORDER

(75) Inventor: In Man Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 09/733,951

(22) Filed: Dec. 12, 2000

(65) Prior Publication Data

US 2001/0004602 A1 Jun. 21, 2001

(30) Foreign Application Priority Data

Dec. 15, 1999 (KR) ............................................. 99-58053

(51) Int. Cl.[7] .......................... H04M 3/00; H04M 1/24; H04M 3/08; H04M 3/22
(52) U.S. Cl. ............................... 379/88.07; 379/32.01; 379/88.16; 379/88.27; 704/258
(58) Field of Search ............................... 379/1.01, 1.02, 379/14.01, 18, 22.01, 26.01, 32.01, 15.01, 67.01, 68, 71, 88.04, 88.16, 88.22, 88.25, 88.27, 88.28; 704/258, 260; 370/247, 248, 249, 250

(56) References Cited

U.S. PATENT DOCUMENTS

| | | | | |
|---|---|---|---|---|
| 4,357,493 A | * | 11/1982 | Anderson et al. | ............. 379/76 |
| 4,446,336 A | * | 5/1984 | Bethel et al. | ................. 379/76 |
| 4,545,043 A | * | 10/1985 | Anderson et al. | ............. 379/76 |
| 4,706,270 A | * | 11/1987 | Astegiano et al. | ............. 379/2 |
| 4,829,514 A | * | 5/1989 | Frimmel, Jr. et al. | ......... 370/58 |
| 5,056,086 A | * | 10/1991 | Libonati | ...................... 370/62 |
| 5,142,527 A | * | 8/1992 | Barbier et al. | ................ 370/62 |
| 5,896,442 A | * | 4/1999 | Song et al. | .............. 379/88.07 |

* cited by examiner

Primary Examiner—Binh Tieu
(74) Attorney, Agent, or Firm—Fleshner & Kim, LLP (57) ABSTRACT

An announcement device in an electronic switching system is disclosed. It includes a virtual recorder in an electronic switching system. This allows for using a virtual channel for recording and monitoring voice announcements without occupying a system channel. The device includes a first switch highway (SHW) control section for controlling an announcement, a second SHW control section for controlling the announcement, a SHW channel for passing control signals of the first SHW control section and the second SHW control section, and a switch coupled to the SHW channel for performing an announcement. The first SHW control section and the second SHW control section perform address latching and data latching, respectively, for the announcement. The announcement device thus allows for a recording/monitoring service or a self loop-back test, without occupying a channel among the SHW channels performing announcement services. By introducing a virtual SHW control section and using a virtual SHW channel to an announcement device in an electronic switching system, in addition to the SHW control section, the system is enhanced.

26 Claims, 6 Drawing Sheets

ANNOUNCEMENT DEVICE WITH VIRTUAL RECORDER

BACKGROUND OF THE INVENTION

1. Field of the Invention

The present invention relates to an announcement device in a switching system, and more particularly to an announcement device including a virtual recorder in an electronic switching system.

2. Background of the Related Art

In general, an announcement device is a device for providing announcement services, i.e., recording the contents of voice services provided by a telecommunication service provider, and playing, or announcing the recorded voice data for the subscriber.

Figure 1:
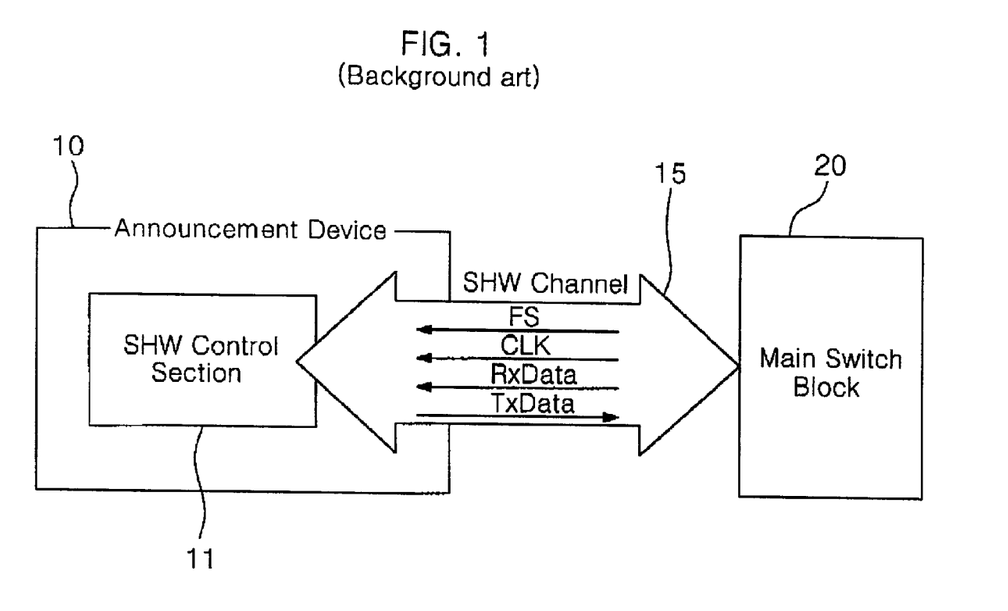
FIG. 1 is a block diagram illustrating a construction of a related art announcement device in an electronic switching system.

Referring to FIG. 1, a related art announcement device 10 includes a switch matching, control section 11 to control announcement functions and record/monitor announcement functions, and a main switch block 20 to send and receive information to/from the announcement device 10. A switch sub-highway (SHW) channel 15 is provided for inputting/outputting frame synchronization signals FS, clock signals CLK, and voice data (Rx Data/Tx Data) to/from the announcement device 10 and the switch 20, in accordance with control signals of the SHW section 11.

Figure 2:
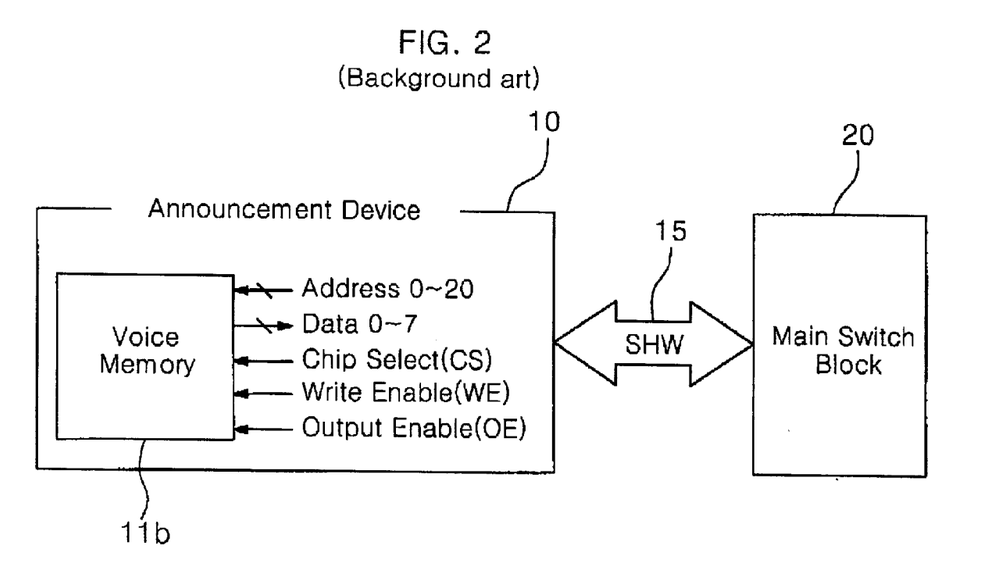
FIG. 2 is a block diagram illustrating an input/output structure of voice memory signals in the device of FIG. 1.

FIG. 2 shows input/output structures of voice memory signals within the switch sub-highway section 11 in FIG. 1. Specifically, the signals include an address signal, a data signal, a chip select (CS), a write enable (WE), and an output enable (OE).

Figure 3:
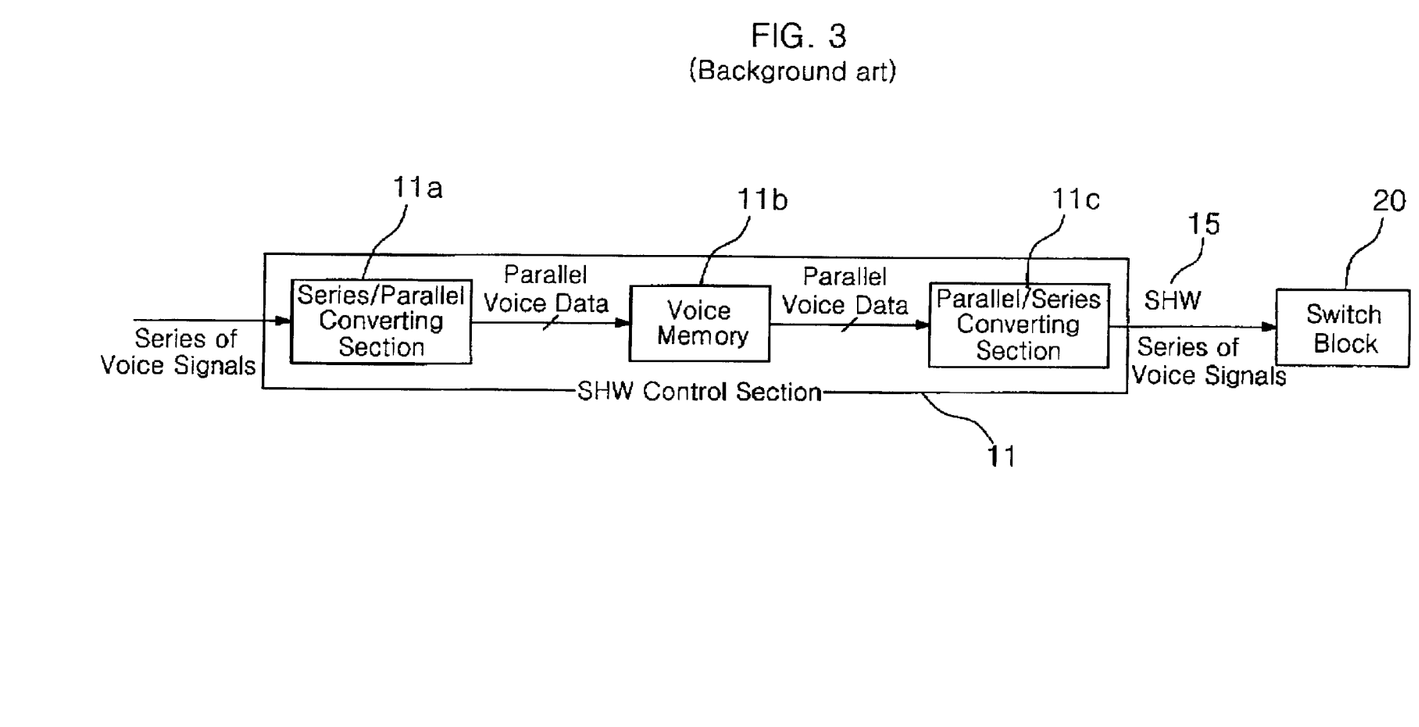
FIG. 3 is a diagram illustrating a flow of voice data in the system of FIG. 1.

FIG. 3 illustrates a series of voice signals, which have been inputted to the SHW section 11 of the announcement device 10. The voice signals are received as serial data, and inputted to a voice memory 11b in the form of parallel voice signals through the series-parallel converting section 11a. The parallel data is then converted to series data by a parallel-series (PS) connecting section 11c. The voice data is then outputted to a switch block 20 through the SHW channel 15.

Figure 4:
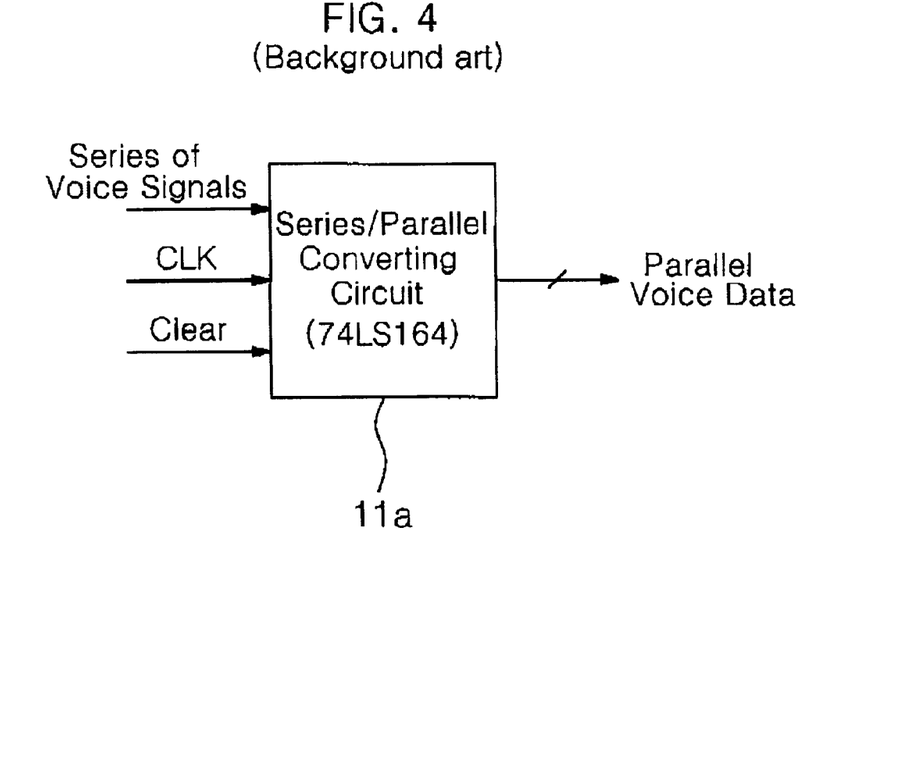
FIG. 4 is a block diagram illustrating a series-parallel converting section of the device shown in FIG. 1.
Figure 5:
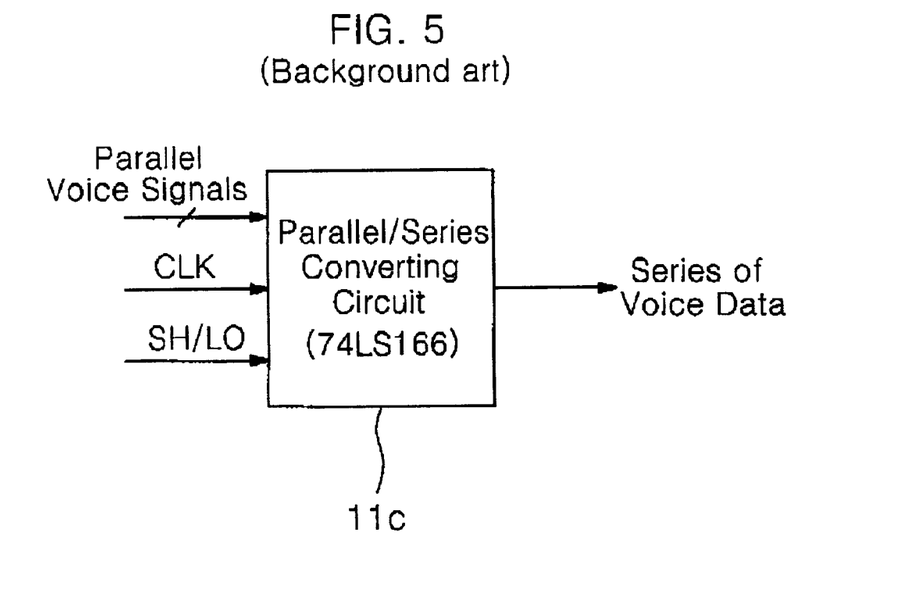
FIG. 5 is a block diagram illustrating a parallel-series converting section of the device shown in FIG. 1.

Additional detail on the series-parallel converting section 11a is shown in FIG. 4, and additional detail of the parallel-series converting section 11c is shown in FIG. 5. With respect to FIG. 4, the series-parallel converter 11a receives the serial voice data signals, along with a clock signal and a clear signal. In response, the series-parallel converter 11a generates parallel voice data. Next, referring to FIG. 5, the parallel-series converter 11c receives parallel voice signals from the voice memory 11b, along with a clock signal and a SH/LO signal, and outputs serial voice data.

An operation of the related art announcement device constructed above will now be described.

The SHW channel 15 typically consists of 64 voice channels. While the number of channels may be variable in each announcement device, an operation with 64 voice channels will be exemplified herein below.

As shown in FIG. 1, the SHW channel 15 comprises a FS, which is a reference clock signal signifying a start of channel "0", and a clock signal CLK providing a time clock for the transmission of voice data, such as Rx Data and Tx data. The FS signal is operated at 8 KHz, while the clock signal CLK is operated at 8 MHz. Therefore, a total of 1,024 clock signal CLK periods exist in a single FS signal period.

The SHW control section 11 controls the FS signals, CLK signals, Rx Data, and Tx Data in the SHW channel 15.

Under normal conditions, that is, when the system is not recording, all of the 64 channels are used for announcement services. If, in the normal condition, a request for an announcement is received from a high level processor, the SHW control section 11 loads an announcement message stored in the voice memory on a particular SHW channel among the 64 voice channels of the SHW channel 15.

Figure 6:
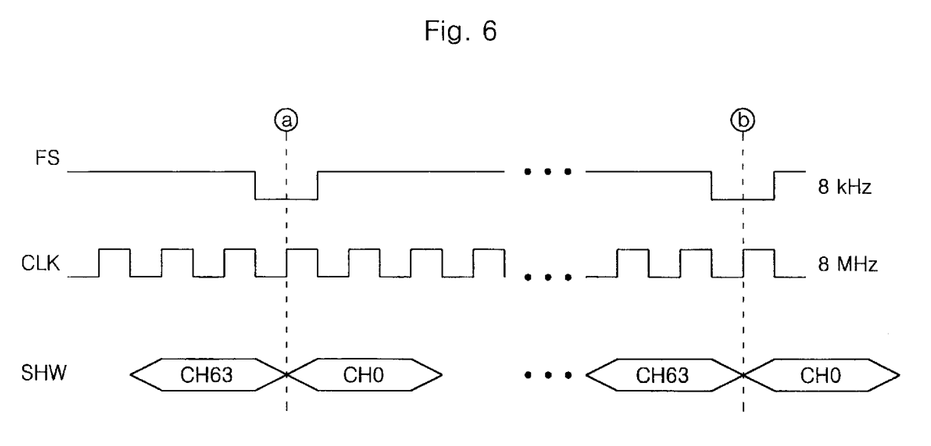
FIG. 6 is a diagram illustrating a waveform of each signal generated during an announcement.

Here, 16 clock signals CLK comprise one channel or a time slot, and 64 channels exist in a single FS signal. Since the SHW channel 15 is in serial lines, the FS signals and the CLK signals constitute each line to consecutively operate to conform to the FS signals. In other words, as shown in FIG. 6, if voice data synchronized as 16 CLK signals in accordance with the FS signals are outputted to each channel, 64 announcement services can be performed through 64 channels in the 1,024 clock signals.

If an address of a particular channel is latched by the SHW control section 11 in accordance with the FS signals and the CLK signals, the voice memory storing the voice messages outputs voice data in accordance with the address. The outputted parallel voice data is converted to series voice data so as to be outputted as Tx Data through a prescribed channel of the SHW channel 15.

Recorded voice data is stored in the voice memory 11b, which is constructed in parallel FIG. 2). In other words, data in the voice memory 11b comprises 20 address signals (address 0–20), 8 data signals (data 0–7), and control signals chip select (CS), write enable (WE), and output enable (OE).

In general, voice is considered to be a single series of analog signals. An analog voice signal is converted to a digital voice signal by an analog-digital converting circuit (CODEC, not illustrated in the drawings) in a voice terminal. In order to store such digitally converted series of voice data in the voice memory 11b, a parallel conversion is required. To do this, the series-parallel (S/P) converting section 11a converts the serial voice data to parallel voice data for storage in the voice memory 11b.

By contrast, in order to provide a desired announcement service with the voice data stored in the voice memory 11b, the voice data must be transferred to a switch block 20 via the SHW 15. Since the SHW 15 is configured for serial signals, the stored parallel signal data must first be converted to serial data through the parallel-series converting section 11c (FIG. 3).

The voice data loaded on each channel occupies a prescribed channel of the SHW channel 15, and is outputted to a main switch block 20. An announcement service is thereby provided.

FS signals and clock signals CLK are also required for recording or reproducing announcements by the announcement device using serial voice data inputted/outputted to and from a voice terminal. The FS signals and clock signals CLK of the SHW channel 15 for voice services are used for that purpose.

Figure 7:
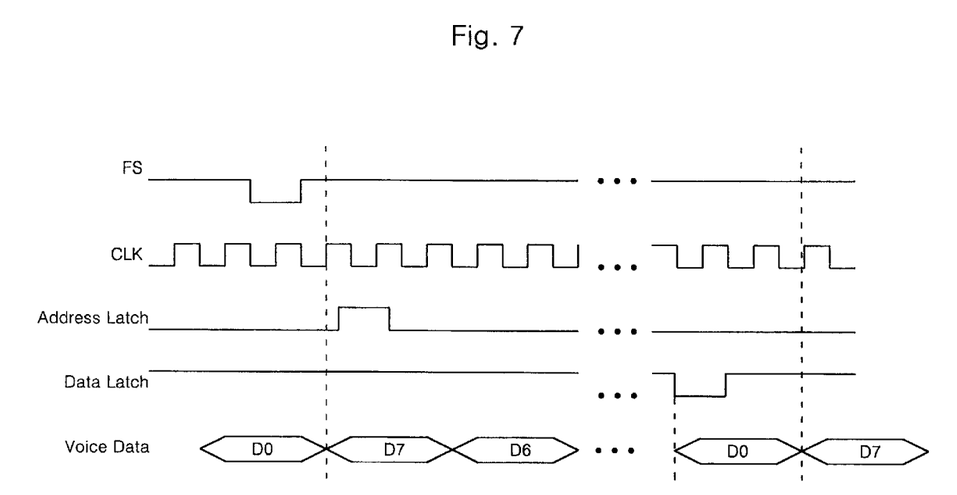
FIG. 7 is a diagram exemplifying a waveform of each signal generated in the course of recording or reproducing voice data.

Referring to FIG. 7, once a recording starts, an address latch signal for selecting a particular address signal of the voice memory 11b is synchronized with the clock signals CLK of the channel 0 memory location. A real address of the voice memory is selected in accordance with the address latch signal. The recorded serial voice data is latched in accordance with each clock signal CLK, and is converted to parallel data. Voice data is outputted in accordance with the data latch signals, thereby storing the voice data in a prescribed address of the voice memory 11b in accordance with the latched address signals. Specifically, the parallel data inputted/outputted to and from the voice memory comprises 8 bit data, consisting of bits D0–D7.

If a series of voice signals are inputted, the series-parallel circuit operates in conformity with a clock signal CLK.

Next, the clock signal CLK is a dually divided signal of the original clock signal to convert 8 MHz to 4 MHz. One channel includes 8 clock signals CLK. In other words, while one channel includes 16 clock signals CLK in the original 8 MHZ, another channel includes 8 clock signals CLK in the divided 4 MHz. Accordingly, D7 is outputted from the first CLK, D6 is outputted from the second CLK, and D0 is outputted from the eighth CLK. The data outputted in conformity with the clock signal CLK are latched and stored in the circuit. Therefore, the data is continuously updated in conformity with the clock signal CLK, and necessary data can be latched and taken at the point of time when D7–D0 are outputted.

The recorded voice can then be played back for monitoring in the same manner as recording. That is, when an address signal is outputted by the address latch signal from the channel 0 memory location in accordance with the FS signals and CLK signals, the voice data of the voice memory 11b is synchronized with the CLK signal of channel 0, and outputted as serial voice data through the voice terminal, thereby enabling monitoring.

As described above, the announcement service and the monitoring/recording service share the same function for generation of the particular address and generation of the voice data corresponding to the particular address. However, a functional difference lies in that the announcement service loads the voice data on the Tx Data of the SHW channel 15, while the monitoring service transfers the voice data to the local voice terminal, for example at a front face panel of the announcement device.

Specifically, with reference to FIG. 3, the voice data generated from the voice memory 11b is 8 bit parallel data, and the line sent to the switch through the SHW is a serial data line. Thus, an announcement service can be performed by loading the serial voice data on the corresponding SHW channel 15 by converting the parallel voice data to the serial voice data.

The front face panel, which provides the monitoring function as stated above, refers to a front portion of the announcement device, i.e., a front panel portion seen at the front by a user when a board is mounted therein. The front face panel can thus be manipulated by the user.

If an operator needs to listen to the contents stored in the voice memory 11b, so as to monitor them, the contents can be heard through the front face panel by manipulation thereof, i.e., by connecting a earphone to a jack mounted on the front face panel.

As described above, the parallel data stored in the voice memory 11b is converted to serial data when reproducing the voice data. The converted serial data are digital signals. Since the audible signals through an output are analog signals, however, a digital-analog converting circuit (CODEC; not shown in the drawings) is required. If the digital signals are converted to analog signals by the CODEC, the operator can listen to the voice data through an earphone.

The related art announcement device in an electronic switching system as described above has various problems. For example, when an operator records or reproduces voice data, a particular channel for announcement services is occupied. Therefore, the particular channel cannot be used for announcement services.

In other words, one out of the 64 channels is occupied when recording or monitoring the voice data. Thus, no announcement service can be provided through the occupied channel, and only 63 channels are available for announcement services.

Announcement services are thus interrupted on a particular channel when recording and monitoring the voice data during the announcement. For instance, when recording or monitoring the voice data while an announcement is on channel 0, the announcement is interrupted since channel 0 is occupied for recording and/or monitoring The above references are incorporated by reference herein where appropriate for appropriate teachings of additional or alternative details, features and/or technical background.

SUMMARY OF THE INVENTION

It is an object of the present invention to provide an announcement device including a virtual recording section in an electronic switching section which substantially overcomes problems caused by disadvantages in the related art.

Another object of the present invention to provide an announcement device including a virtual recording section in an electronic switching system, which can perform recording/monitoring of voice data simultaneously with announcement services, without occupying a particular channel.

Another object of the present invention to provide an announcement device including a virtual recording section in an electronic switching system, which can perform the announcement services with address latch signals and data latch signals occupying a virtual channel additionally employed.

Another object of the present invention to provide an announcement device including a virtual recording section in an electronic switching system, which can improve the manner of occupying channels so as to record/monitor voice data without occupying a particular channel by using a virtual channel.

To achieve at least the above objects, in whole or in parts, there is provided an announcement device including a virtual recording section comprising a first SHW control section for controlling an announcement, a second SHW control section for controlling the announcement, a SHW channel for passing of control signals from the first and the second SHW control sections, and a switch block for performing an announcement by being connected to the SHW channel.

According to a preferred embodiment of the present invention as broadly described herein, all of the SHW channels can be engaged in announcement services during the recording or reproducing of voice data, and monitoring or a self loop-back test can be performed with respect to the voice recording or announcement without interrupting the announcement services through a particular channel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 8:
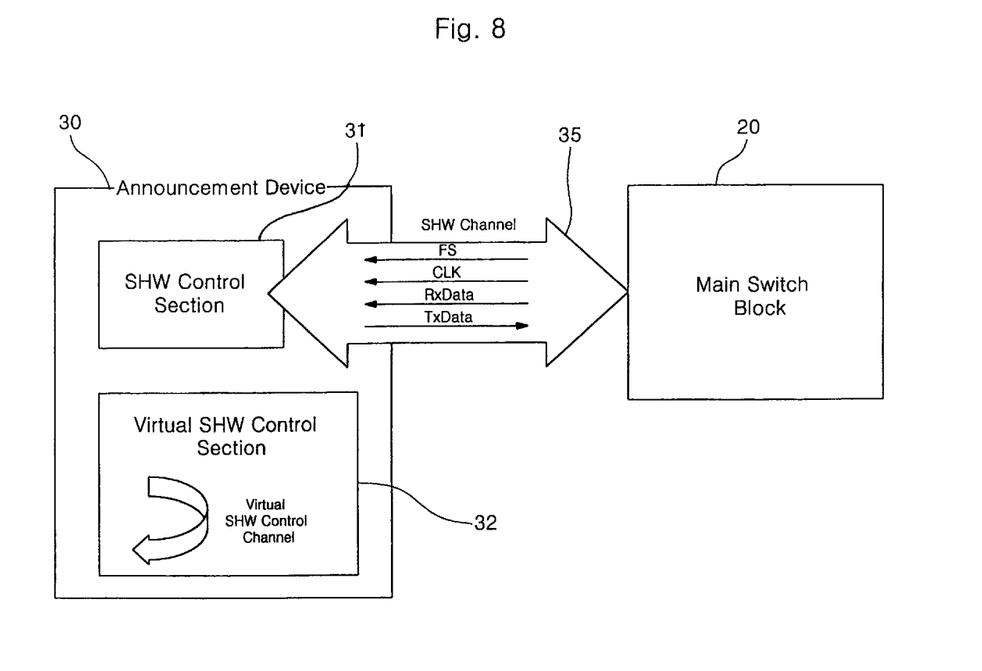
FIG. 8 is a block diagram illustrating an announcement device including a virtual recording section in an electronic switching system according to a preferred embodiment of the present invention.

FIG. 8 is a block diagram illustrating an announcement device including a virtual recording section in an electronic switching system according to a preferred embodiment of the present invention. Referring to FIG. 8, the announcement device 31 preferably includes a SHW control section 31 for controlling an announcement function of an electronic switching system, and a virtual SHW control section 32 for controlling the recording/monitoring of voice data when the SHW control section 31 controls the announcement function. A SHW channel 35 is provided for inputting/outputting FS signals, CLK signals, Rx Data, and Tx Data in accordance with control signals of the SHW control section 31. Finally, a switch block 20 performs an announcement function, and is coupled to the SHW channel 35.

Figure 10:
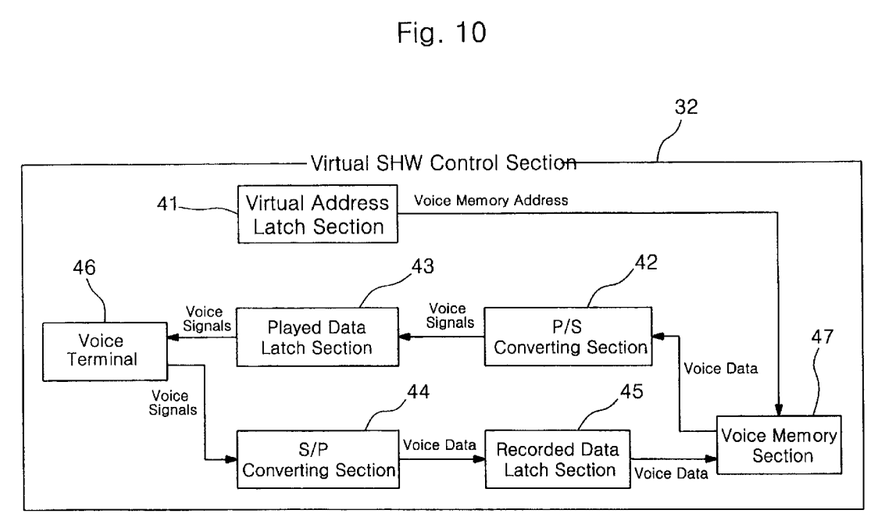
FIG. 10 is a block diagram illustrating a virtual SHW control section in FIG. 8.
Figure 11:
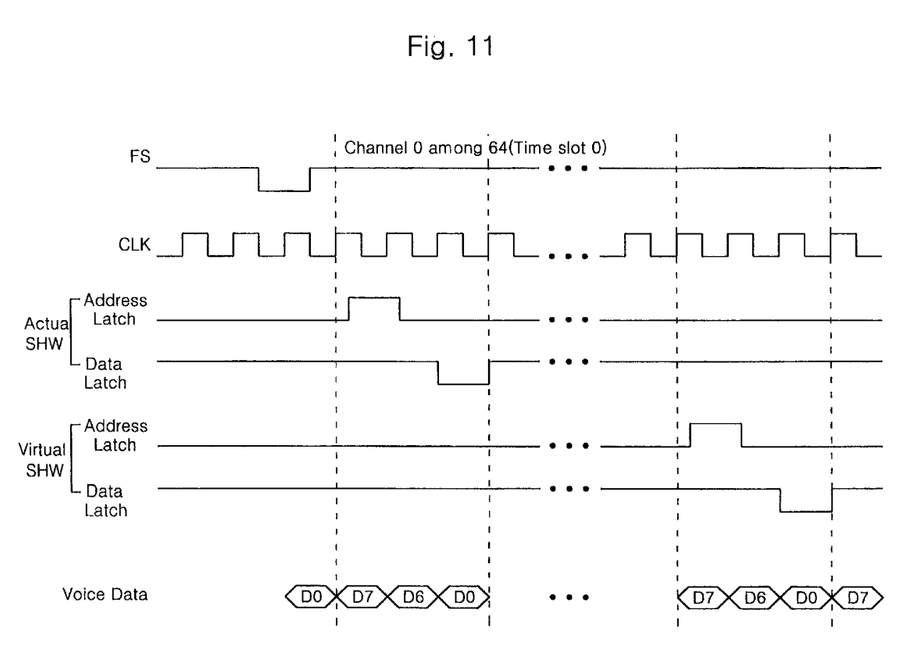
FIG. 11 is a diagram illustrating a detailed timing of each signal according to the announcement device in FIG. 8.

FIG. 10 is a block diagram illustrating the virtual SHW control section 32 of FIG. 8. Referring to FIG. 10, the virtual SHW control section 32 includes a virtual address latch section 41 for latching and outputting address signals of a voice memory 47 when recording/monitoring voice data. Next, a parallel/serial (P/S) converting section 42 is provided for converting parallel voice data outputted from a particular address of the voice memory 47 to a serial voice data following the designation by the address latch section 41. A reproduced data latch section 43 is provided for latching the voice signals outputted from the P/S converting section 42, and outputting the latched voice signals to a voice terminal 46.

Additionally, a serial/parallel (S/P) converting section 44 is provided for converting the serial voice data outputted from the voice terminal 46 to parallel voice data. A recorded data latch section 45 latches the voice data outputted from the S/P converting section 44, and outputs the latched voice data to a prescribed address of the voice memory 47 following the designation by the virtual address latch section 41. The voice memory 47 is coupled to the recorded data latch section 45 to store voice data. The construction of each block in the virtual SHW control section 32 is the same as that of each block of the actual SHW control section 31.

The address latch generates address latch signals at a desired point of time before data latch signals are outputted, so as to generate desired address signals. This enables the storage of voice data in a desired voice memory location.

The address signals are the signals periodically changed in each channel. Thus, the address signals are fixed by the latch signals at a point of time when the desired signal is outputted until the desired voice data is outputted.

Once latched, an address is not changed until another latch signal is outputted, even if another address signal is outputted. Therefore, a desired address signal can be safely transferred until the voice data is outputted.

An operation of the announcement device constructed above will next be described.

The announcement device according to the preferred embodiment of the present invention is characterized by separating a channel occupied for recording/monitoring voice data from the channels occupied for announcement services. It does this by employing a virtual SHW control section 32 to provide a separate channel, which is used for recording/monitoring the voice of the for announcement.

As in case of the related art, the channel occupied for announcement services uses each channel of the SHW channel 35. Additionally, it uses a virtual SHW control section 32, which is comprised apart from the SHW channel 35, during recording or monitoring (i.e., reproduction) of voice data. A recording or monitoring service of the voice data can therefore be performed without limiting the announcement services of the SHW channel. Thus, in addition to the single SHW channel 35 provided outside of the announcement device, a virtual SHW channel 32 is additionally provided inside the announcement device for the purpose of recording/monitoring the voice data. Therefore, the effect is as if two SHW channels exist.

Figure 9:
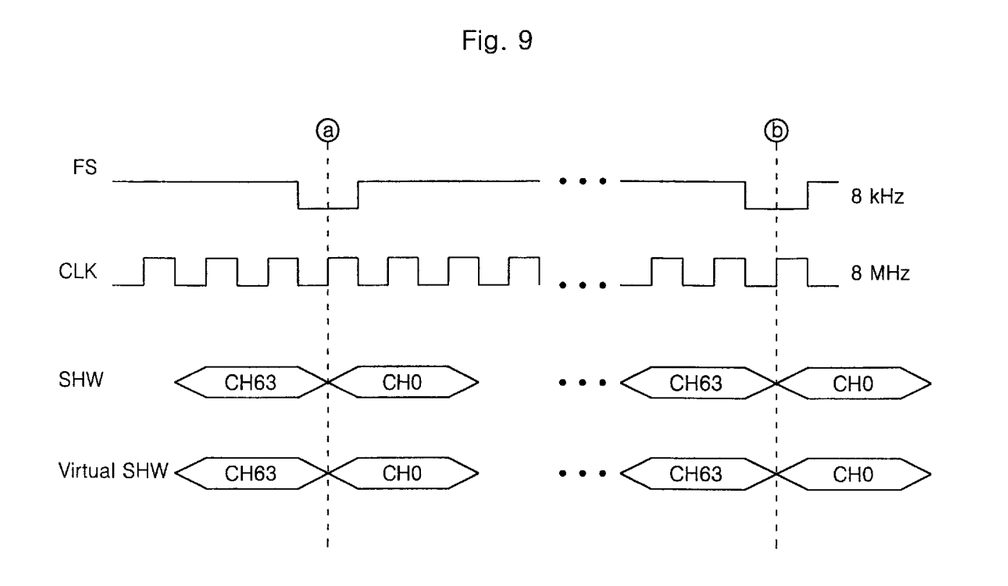
FIG. 9 is a diagram illustrating a timing of each signal according to the announcement device in FIG. 8.

FIG. 9 is a diagram illustrating a timing of each signal according to the announcement device in FIG. 8. If a user records or monitors voice data through a voice terminal 46 of an electronic switching system, the virtual SHW control section 32 occupies each channel of the virtual SHW channel to perform recording or reproduction of the voice data, as shown in FIG. 9. Thus, all of the 64 channels of the SHW channel 35 can be used for announcement services.

An operation of separately providing a recording/monitoring service and announcement services by using the virtual SHW control section 32 occupying each channel of the virtual SHW channel will now be described.

One SHW channel 35 preferably comprises 64 channels. Recording or announcement services of voice data can be performed through any one channel among those 64 channels.

A desired address and data signals are required for recording. To operate using a prescribed channel, synchronization using FS signals and CLK signals is critical. Therefore, in order to generate the desired address and data signals for recording, it is necessary to occupy any particular channel among the SHW channels, and store data corresponding to the recording in the corresponding address as parallel data.

As recited before, the channel occupied for recording becomes unavailable until completion of the recording. This is because a channel for an announcement operates once announcement services are initiated during the recording. Further, voice data is outputted in parallel through a particular channel in accordance with a desired address during the announcement services. Also, announcement data is transferred through the SHW channel 35 after being converted to serial data by a converting circuit. Thus, if a recording is started at this stage, address data conforming to the recording is generated, so as to be able to access a voice memory area, and the announcement services would be interrupted in the middle.

To solve this problem, a virtual SHW control section is used to create a virtual SHW channel in addition to the actual 64 SHW channels. Recording is preferably performed by occupying the virtual SHW channel, and the address and data latch signals generated at that time are different from those generated when performing the announcement services. Therefore, recording does not affect the announcement services.

For example, when a recording and an announcement service are simultaneously performed through channel 0, and if announcement services are provided by the SHW control section 31, the announcement services would be interrupted. Specifically, if a recording is performed during announcement of the voice data in the desired address area of the voice memory 47 after address latching and data latching, the announcement services are interrupted because the address latching and data latching are performed in the area necessary for recording, instead of performing the announcement services.

If a virtual SHW control section is used, however, address latch and data latch signals are still generated during the announcement services. If recording starts in the meantime, the address latch signals and data latch signals continue to be served without interruption. Instead, the virtual SHW control section 32 generates the address latch and data latch signals necessary for the recording, thereby enabling the recording/storing of the address and data generated from the virtual SHW control section 32 in the corresponding area.

If such a virtual SHW control section 32 performs a playback to monitor the voice data, as shown in FIG. 10, the address latch section 41 latches and outputs the address signals designating a particular address of a voice memory section 47. Then, the P/S converting section 42 converts the parallel voice data outputted from the particular address of the voice memory section 47 to a series of voice signals, and outputs the converted voice signals. The voice signals outputted from the P/S converting section 42 are latched by the playing playback data latch section 43, and outputted to the voice terminal 46 so that the user can monitor the voice data.

When a recording is performed for announcement services, the virtual SHW control section 32 functions as follows. First, the address latch section 41 latches and outputs an address signal designating a particular address of the voice memory section 47. Then, the S/P converting section 44 converts the series of voice signals inputted through the voice terminal 46 to parallel voice data. The recorded data latch section 45 latches the voice data outputted from the S/P converting section 44, and outputs the latched voice data to the voice memory section 47. The voice data is then preferably stored in the particular address designated by the address latch section 41.

As described above, the present invention has many advantages. For example, the system is capable of performing recording/monitoring or a self loop-back test without occupying any of the SHW channels needed to perform announcement services. Additionally, the system uses a virtual SHW control section and a virtual SHW channel with an announcement device in an electronic switching system, in addition to the related art SHW control section. Such a virtual SHW control section 32 may be employed in a variety of ways, and is useful for purposes other than the recording or monitoring service. For example, a channel must be occupied to perform a self loop-back test. Using the SHW control section 32 enables the self loop-back test to be performed without affecting the functions of announcement services, or the recording and monitoring of voice data.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An announcement device in an electronic switching system, comprising:
   a first switch highway (SHW) controller, to control an announcement function of the announcement device;
   a second SHW controller to control only recording and monitoring functions of the announcement device;
   a SHW channel coupled to the first and second SHW controllers, the SHW channel having a plurality of channels thereon and configured to provide a communication path for signals of the first and second SHW controllers; and
   a switch block coupled to the SHW channel to perform the announcement service.

2. The announcement device of claim 1, wherein the second SHW controller is a virtual SHW controller.

3. The device of claim 2, further comprising at least one additional virtual SHW controller.

4. The device of claim 2, wherein the second SHW controller occupies a prescribed channel to perform the announcement service and to conduct a self loop-back test.

5. The device of claim 1, wherein the SHW channel comprises at least one frame synchronization signal, at least one clock signal, and at least one voice data signal.

6. The device of claim 1, wherein the first SHW controller and the second SHW controller operate independently to control the announcement and the recording/monitoring.

7. The device of claim 1, wherein the first SHW controller and the second SHW controller each perform address latching and data latching for the announcement.

8. The device of claim 7, wherein the second SHW controller generates address latch signals and data latch signals to retrieve data in a voice memory location for monitoring, and generates address latch signals and data latch signals necessary to record data to the voice memory, and wherein the recording and the monitoring and recording functions are carried out without interrupting the address latch signals and the data latch signals of the first SHW controller.

9. The device of claim 1, wherein the SHW channel comprises a first SHW channel and a second SHW channel, wherein the first SHW controller is coupled to the first SHW channel and the second SHW controller is coupled to the second SHW channel.

10. The device of claim 9, wherein the first SHW channel is occupied only during the announcement service and the second SHW channel is occupied only during recording and monitoring.

11. The device of claim 9, wherein the first and second SHW channels are distinct from one another.

12. The device of claim 1, wherein the second SHW controller comprises:

an address latch to latch and output address signals of a voice memory when recording or reproducing voice data;

a parallel-to-serial (P/S) converter to convert parallel voice data outputted from a prescribed address of the voice memory designated by the address latch section to serial voice data when reproducing the voice data;

a reproduced data latch to latch voice signals outputted from the P/S converter section, and output the latched voice signals to a voice terminal;

a serial-to-parallel (S/P) converter to convert serial voice data outputted from the voice terminal to parallel voice data; and a recorded data latch to latch the voice data outputted from the S/P converter, and output the latched voice data to a prescribed address of the voice memory designated by the address latch section.

13. The device of claim 10, wherein the first SHW channel comprises a plurality of voice data channels, which are designated exclusively for announcement services.

14. The device of claim 13, wherein the second SHW channel is a virtual SHW channel.

15. The device of claim 12, wherein the second SHW controller controls only a recording and monitoring feature, and the first SHW controller controls only an announcement feature of the announcement service.

16. The device of claim 8, wherein the first SHW controller controls the announcement function exclusive of the second SHW controller.

17. The device of claim 12, wherein the SHW channel comprises a local channel and a remote channel, wherein the local channel is coupled to the second SHW controller to record and monitor announcements, and wherein the remote channel is coupled to the first SHW controller to provide the announcement service to subscribers through a switch.

18. The device of claim 1, wherein the recording and monitoring functions are performed without using the plurality of channels of the SHW channel.

19. The device of claim 1, wherein the SHW channel comprises 64 channels, and wherein all 64 channels are available for the announcement function, and wherein the recording and monitoring function uses none of the 64 channels.

20. The device of claim 1, wherein only the first SHW controller is used to control the announcement function, and wherein only the second SHW controller is used to control the recording and monitoring functions.

21. A method of simultaneously providing, recording, and monitoring of an announcement service, comprising:

providing a first switch highway (SHW) controller to control providing of announcements in an announcement service;

providing a second SHW controller to control only recording and monitoring of the announcement service, the control of the recording and monitoring being independent of the control provided by the first SHW controller;

providing a first SHW channel to couple the first SHW to a main switch to provide the announcement to a user; and providing a second SHW channel to couple the second SHW to a recording/monitoring device.

22. The method of claim 21, wherein the second SHW is a virtual SHW and the second SHW channel is a virtual SHW channel.

23. The method of claim 21, wherein the recording and monitoring functions are performed without using the first SHW channel, and wherein the second SHW channel is a virtual channel.

24. The method of claim 21, wherein the recording and monitoring functions can be performed without limiting a number of channels available to provide the announcement.

25. The method of claim 21, wherein the first SHW channel is a physical channel and wherein the second SHW channel is a virtual channel.

26. The method of claim 21, wherein only the first SHW controller is used to control the providing of announcements, and wherein only the second SHW controller is used to control the recording and monitoring of announcements.

* * * * *